(12) United States Patent
Iwaki et al.

(10) Patent No.: US 11,507,701 B2
(45) Date of Patent: Nov. 22, 2022

(54) AUTHENTICATION SYSTEM

(71) Applicant: Yazaki Corporation, Tokyo (JP)

(72) Inventors: Takahiro Iwaki, Shizuoka (JP); You Yanagida, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 166 days.

(21) Appl. No.: 17/158,663

(22) Filed: Jan. 26, 2021

(65) Prior Publication Data

US 2021/0232713 A1 Jul. 29, 2021

(30) Foreign Application Priority Data

Jan. 27, 2020 (JP) .............................. JP2020-011055

(51) Int. Cl.
*G06F 21/73* (2013.01)
*G06F 21/44* (2013.01)
*H04L 9/32* (2006.01)

(52) U.S. Cl.
CPC .............. *G06F 21/73* (2013.01); *G06F 21/44* (2013.01); *H04L 9/3228* (2013.01); *H04L 2209/80* (2013.01); *H04L 2209/84* (2013.01)

(58) Field of Classification Search
CPC .. G06F 21/73; G06F 21/44; G06F 2221/2129; H04L 2209/84
See application file for complete search history.

(56) References Cited

U.S. PATENT DOCUMENTS

| | | | | |
|---|---|---|---|---|
| 9,002,534 B2* | 4/2015 | Grasso | .................... | B60R 25/00 701/1 |
| 10,124,766 B2* | 11/2018 | Brahner | .................. | B60R 25/00 |
| 2009/0153311 A1* | 6/2009 | Lee | ..................... | B60R 25/2018 340/426.1 |
| 2012/0123611 A1* | 5/2012 | Grasso | .................... | B60R 25/00 701/1 |
| 2018/0265037 A1* | 9/2018 | Brahner | .............. | B60R 25/2009 |
| 2020/0153636 A1 | 5/2020 | Takada et al. | | |

FOREIGN PATENT DOCUMENTS

JP 2019-009509 A 1/2019

* cited by examiner

*Primary Examiner* — Ellen Tran
(74) *Attorney, Agent, or Firm* — Banner & Witcoff, Ltd.

(57) ABSTRACT

In an authentication system, when an electrical component with a temporary ID recorded by a temporary ID assignment device is connected to a switching hub, a temporary authentication device performs temporary authentication based on switching hub information describing the switching hub to which the electrical component is connected, the temporary ID of the electrical component, and temporary authentication inquiry information. A main authentication device performs main authentication based on the switching hub information of the switching hub to which the electrical component with a formal ID recorded by the formal ID assignment device is connected, and the formal ID of the electrical component, and main authentication inquiry information.

11 Claims, 6 Drawing Sheets

FIG.2

| VEHICLE TYPE CODE | ELECTRICAL COMPONENT VEHICLE EQUIPMENT CODE | ELECTRICAL COMPONENT MANUFACTURING LOCATION CODE | ELECTRICAL COMPONENT MANUFACTURING LOT CODE |
|---|---|---|---|
| × × × | × × × | × × × | × × × |

FIG.3

| VEHICLE BODY NUMBER CODE | VEHICLE MANUFACTURING DATE AND TIME CODE | TEMPORARY ID | VEHICLE MANUFACTURING LOCATION CODE |
|---|---|---|---|
| × × × | × × × | × × × | × × × |

FIG.7

| VEHICLE TYPE CODE | ELECTRICAL COMPONENT VEHICLE EQUIPMENT CODE | ELECTRICAL COMPONENT REPAIR DATE AND TIME CODE | ELECTRICAL COMPONENT REPAIR LOCATION CODE |
|---|---|---|---|
| ××× | ××× | ××× | ××× |

FIG.8

| VEHICLE BODY NUMBER CODE | REPLACEMENT COMPLETION DATE AND TIME CODE | REPLACEMENT TEMPORARY ID | ELECTRICAL COMPONENT REPLACEMENT LOCATION CODE |
|---|---|---|---|
| ××× | ××× | ××× | ××× |

AUTHENTICATION SYSTEM

CROSS-REFERENCE TO RELATED APPLICATION(S)

The present application claims priority to and incorporates by reference the entire contents of Japanese Patent Application No. 2020-011055 filed in Japan on Jan. 27, 2020.

BACKGROUND OF THE INVENTION

1. Field of the Invention

The present invention relates to an authentication system.

2. Description of the Related Art

Conventionally, as an authentication system, for example, a vehicle authentication system that individually authenticates parts installed in a vehicle has been developed. This vehicle authentication system ensures the security of each part by authenticating the part with an identification ID of the part when the part is assembled to a vehicle body. Note that Japanese Patent Application Laid-open No. 2019-009509 describes an on-board authentication system that authenticates communication equipment connected to a network in a vehicle based on a private key and a public key.

In the aforementioned vehicle authentication system, it is conceivable to improve security by assigning each part a part-specific identification ID, and associating this identification ID with the vehicle body on a one-to-one basis. However, in this case of the aforementioned vehicle authentication system, another part of the same type but having a different identification ID cannot be assembled to the vehicle. This may lead to a decrease in workability when assembling the parts into the vehicle, and the authentication process of the parts may not be performed properly. When the identification ID and the vehicle body are not associated with each other on a one-to-one basis, the aforementioned vehicle authentication system cannot ensure security, which may result in illegal modification or tampering of the parts, spoofing, and the like.

SUMMARY OF THE INVENTION

The present invention has been made in view of the above problems, and is intended to provide an authentication system that can properly perform the authentication process of parts installed in a vehicle while ensuring the security of the parts.

In order to solve the above mentioned problem and achieve the object, an authentication system according to one aspect of the present invention includes an ID management device that, for a plurality of parts to be connected to a connecting equipment installed in a vehicle, issues a temporary ID for identifying a type of the parts for each type, and a formal ID for identifying an individual part of the parts for each individual part, and manages temporary authentication inquiry information describing a legitimate combination of the temporary ID of the part and legitimate connecting equipment information describing the connecting equipment to which the part is connected, and main authentication inquiry information describing a legitimate combination of the formal ID of the part and the legitimate connecting equipment information; a temporary ID assignment device that records the same temporary ID in the parts of the same type; a temporary authentication device that performs temporary authentication of each of the parts to be installed in the vehicle based on the temporary ID recorded in the part; a formal ID assignment device that records the formal ID in each of the parts, the formal ID being different for each part; and a main authentication device that performs main authentication of the part to be installed in the vehicle based on the formal ID recorded in the part, wherein the ID management device issues the temporary ID to the part with no ID recorded, the part having no recorded temporary ID or formal ID, and generates the temporary authentication inquiry information based on the issued temporary ID and the legitimate connecting equipment information, the temporary ID assignment device records the temporary ID in the part with no ID recorded in accordance with the type of the part, when the part with the temporary ID recorded by the temporary ID assignment device is connected to the connecting equipment, the temporary authentication device performs temporary authentication based on actual connecting equipment information describing the connecting equipment to which the part is connected, the temporary ID of the part, and the temporary authentication inquiry information, the ID management device issues the formal ID to the part that has been validated by the temporary authentication by the temporary authentication device, and generates the main authentication inquiry information based on the issued formal ID and the legitimate connecting equipment information, the formal ID assignment device records the formal ID in each of the parts that have been validated, the formal ID being different for each part, and the main authentication device performs main authentication based on the actual connecting equipment information of the connecting equipment to which the part with the formal ID recorded by the formal ID assignment device is connected, the formal ID of the part, and the main authentication inquiry information.

According to another aspect of the present invention, in the authentication system, it is preferable that the formal ID assignment device does not record the formal ID in the part that has not been validated, and the main authentication device does not perform the main authentication of the part in which the formal ID has not been recorded by the formal ID assignment device.

According to still another aspect of the present invention, in the authentication system, it is preferable that the ID management device issues a replacement temporary ID for identifying, for each type, a type of replacement parts to be replace the parts installed in the vehicle, and a replacement formal ID for identifying an individual replacement part of the replacement parts for each individual replacement part, and manages temporary authentication inquiry information describing a legitimate combination of the replacement temporary ID of the replacement part and legitimate connecting equipment information describing the connecting equipment to which the replacement part is connected, and main authentication inquiry information describing a legitimate combination of the replacement formal ID of the replacement part and the legitimate connecting equipment information, the ID management device issues the replacement temporary ID to the replacement part with no ID recorded, the replacement part having no recorded replacement temporary ID or replacement formal ID, and generates the temporary authentication inquiry information based on the issued replacement temporary ID and the legitimate connecting equipment information, the temporary ID assignment device records the replacement temporary ID in the replacement part with no ID recorded in accordance with the type of the replacement part, when the replacement part with the replacement temporary ID recorded by the temporary ID assignment device is connected to the connecting equipment, the temporary authentication device performs temporary authentication based on actual connecting equipment information describing the connecting equipment to which the replacement part is connected, the temporary ID of the replacement part, and the temporary authentication inquiry information, the ID management device issues the replacement formal ID to the replacement part that has been validated by the temporary authentication by the temporary authentication device, and generates the main authentication inquiry information based on the issued replacement formal ID and the legitimate connecting equipment information, the formal ID assignment device records the replacement formal ID in each of the replacement parts that have been validated, the replacement formal ID being different for each replacement part, and the main authentication device performs main authentication based on the actual connecting equipment information of the connecting equipment to which the replacement part with the replacement formal ID recorded by the formal ID assignment device is connected, the replacement formal ID of the replacement part, and the main authentication inquiry information.

According to still another aspect of the present invention, in the authentication system, it is preferable that the temporary ID assignment device records the temporary ID in the part via a wireless communication line that performs wireless communication, and the formal ID assignment device records the formal ID in the part via a wireless communication line that performs wireless communication.

According to still another aspect of the present invention, in the authentication system, it is preferable that the temporary authentication device and the main authentication device are built into the connecting equipment.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an example configuration of a temporary ID according to the embodiment;

FIG. 3 is a diagram illustrating an example configuration of a formal ID according to the embodiment;

FIG. 7 is a diagram illustrating an example configuration of a replacement temporary ID according to the other modification of the embodiment; and FIG. 8 is a diagram illustrating an example configuration of a replacement formal ID according to the other modification of the embodiment.

DETAILED DESCRIPTION OF THE PREFERRED EMBODIMENTS

An embodiment for implementing the present invention will be described in detail with reference to the drawings. The present invention is not limited by the contents described in the following embodiment. In addition, the components listed below include those that can be readily conceived by the person skilled in the art and are substantially the same. Furthermore, the configurations described below can be combined as appropriate. Various omissions, substitutions or modifications of the configurations can be made without departing from the gist of the present invention.

Embodiment

Figure 1:
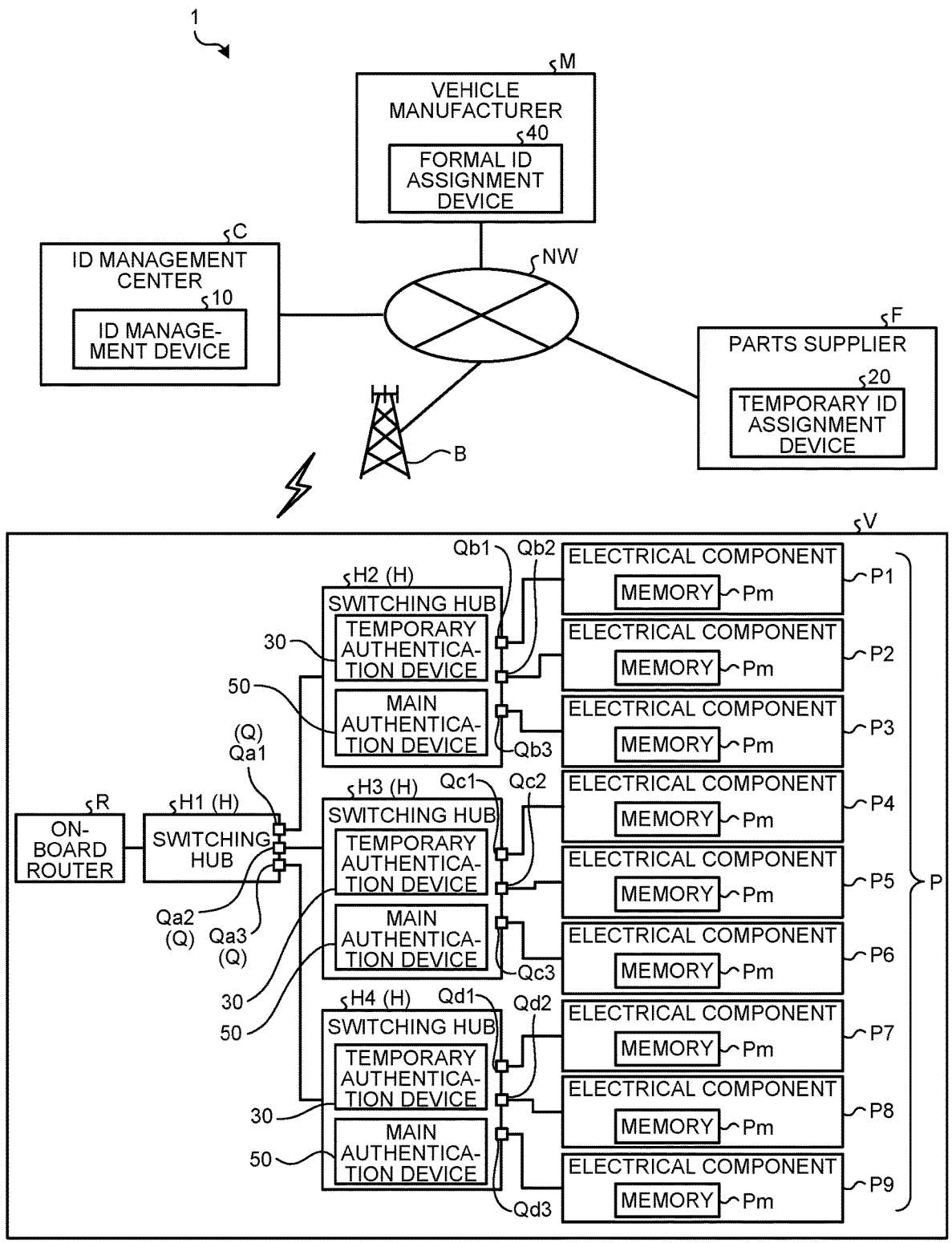
FIG. 1 is a block diagram illustrating an example configuration of an authentication system according to an embodiment.

An authentication system 1 according to an embodiment will be described with reference to the drawings. FIG. 1 is a block diagram illustrating an example configuration of the authentication system 1 according to the embodiment. FIG. 2 is a diagram illustrating an example configuration of a temporary ID according to the embodiment. FIG. 3 is a diagram illustrating an example configuration of a formal ID according to the embodiment. The authentication system 1 is a system for authenticating a plurality of electrical components P to be installed in a vehicle V. For example, the authentication system 1 authenticates the electrical components P when the electrical components P are assembled to a vehicle body of the vehicle V on a vehicle manufacturing line that manufactures the vehicle V at a vehicle manufacturer M.

Here, an on-board router R, switching hubs H (H1 to H4) serving as connecting equipment, and the electrical components P (P1 to P9) are installed in the vehicle V. The on-board router R is communication equipment that connects to an external communication network NW in a wirelessly communicable manner via an LTE (Long Term Evolution) communication line or a Wi-Fi communication line configured by a base station B. The on-board router R transfers data to the outside of the vehicle V via the communication network NW, and also transfers data acquired via the communication network NW to the switching hub H1.

The switching hubs H (H1 to H4) are communication equipment that relay data between the on-board router R and the electrical components P. The switching hub H1 is connected to the on-board router R and the switching hubs H2 to H4, and relays data between the on-board router R and the switching hubs H2 to H4. The switching hub H1 has a plurality of ports Q (Qa1 to Qa3), and the switching hubs H2 to H4 are connected to the respective ports Q.

The switching hub H2 is connected to the switching hub H1 and the electrical components P1 to P3, and relays data between the switching hub H1 and the electrical components P1 to P3. The switching hub H2 has a plurality of ports Q (Qb1 to Qb3), and the electrical components P1 to P3 are connected to the respective ports Q. The switching hub H3 is connected to the switching hub H1 and the electrical components P4 to P6, and relays data between the switching hub H1 and the electrical components P4 to P6. The switching hub H3 has a plurality of ports Q (Qc1 to Qc3), and the electrical components P4 to P6 are connected to the respective ports Q. The switching hub H4 is connected to the switching hub H1 and the electrical components P7 to P9, and relays data between the switching hub H1 and the electrical components P7 to P9. The switching hub H4 has a plurality of ports Q (Qd1 to Qd3), and the electrical components P7 to P9 are connected to the respective ports Q.

The electrical components P are installed in the vehicle V and constitute an electronic control unit (ECU), sensors, and the like. The electrical components P include the electrical components P1 to P9. Each of the electrical components P1 to P9 has a memory Pm for storing information. The electrical components P1 to P9 are classified into different types according to the function, installation location, connection destination, or the like of the electrical components P. The authentication system 1 is a system for authenticating the electrical components P installed in the vehicle V. This authentication system 1 will be described in detail below.

As illustrated in FIG. 1, the authentication system 1 includes, for example, an ID management device 10, a temporary ID assignment device 20, temporary authentication devices 30, a formal ID assignment device 40, and main authentication devices 50.

The ID management device 10 is a device that issues a temporary ID and a formal ID, and manages the issued temporary ID and formal ID. The ID management device 10 is installed in an ID management center C, for example, which manages the temporary ID and the formal ID. Here, for the electrical components P, the temporary ID is an identifier for identifying a type of the electrical components P for each type. The same temporary ID is recorded in the electrical components P of the same type. A type of the electrical components P is, for example, a category that is classified by the function, installation location, connection destination, or the like of the electrical components P. The temporary ID includes a plurality of items. As illustrated in FIG. 2, for example, the temporary ID includes the items "vehicle type code", "electrical component vehicle equipment code", "electrical component manufacturing location code", and "electrical component manufacturing lot code". The vehicle type code is an identifier indicating the vehicle type of the vehicle V. The same vehicle type is indicated by the same identifier. The electrical component vehicle equipment code is an identifier for each type of the electrical components P. The electrical components P of the same type have the same identifier. The electrical component manufacturing location code is an identifier indicating the manufacturing location of each electrical component P. The same manufacturing location is indicated by the same identifier. The electrical component manufacturing lot code is a manufacturing identifier of each electrical component P. The ID management device 10 acquires, from a parts supplier F (temporary ID assignment device 20), the vehicle type code, the electrical component vehicle equipment code, the electrical component manufacturing location code, and the electrical component manufacturing lot code as generating information of a temporary ID, and generates the temporary ID based on the acquired generating information. The ID management device 10 may disable the temporary ID after a specified time has elapsed from the generation of the temporary ID. Note that, after generating the formal ID of the electrical component P, the ID management device 10 may disable the temporary ID of the electrical component P for which the formal ID has been generated. Note that, for the purpose of improving the security level of the temporary ID, an equipment ID (individual ID) unique to each of the switching hubs H in the vehicle V may be included in the configuration of the temporary ID.

The ID management device 10 acquires, from the parts supplier F (temporary ID assignment device 20), switching hub information (legitimate connecting equipment information) describing the switching hubs H to which the electrical components P are connected. The ID management device 10 manages temporary authentication inquiry information describing a legitimate combination of the acquired switching hub information and the temporary ID of the electrical component P. The switching hub information includes, for example, the equipment IDs unique to the respective switching hubs H, the port numbers of the switching hubs H, and the like. As such, the ID management device 10 manages which electrical component P is to be connected to which port Q of the switching hubs H for each type of the electrical components P by using the temporary authentication inquiry information. The ID management device 10 is connected to the temporary ID assignment device 20, the temporary authentication devices 30, the formal ID assignment device 40, and the main authentication devices 50 via the communication network NW. Upon request from these devices, the ID management device 10 provides the temporary ID of an electrical component P or the temporary authentication inquiry information including the combination of the temporary ID of the electrical component P and the switching hub information.

The formal ID is an identifier for identifying an individual electrical component P of the individual electrical components P for each individual electrical component P. A different formal ID is recorded in each individual electrical component P. The formal ID includes a plurality of items. As illustrated in FIG. 3, for example, the formal ID includes the items "vehicle body number code", "vehicle manufacturing date and time code", "temporary ID", and "vehicle manufacturing location code". The vehicle body number code is a unique identifier assigned to each vehicle body of the vehicle V. The vehicle manufacturing date and time code is an identifier indicating the date and time the vehicle V was manufactured. The vehicle manufacturing location code is an identifier indicating the location where the vehicle V was manufactured. The ID management device 10 acquires, from the vehicle manufacturer M (formal ID assignment device 40), the vehicle body number code, the vehicle manufacturing date and time code, the temporary ID, and the vehicle manufacturing location code as generating information of a formal ID, and generates the formal ID based on the acquired generating information.

The ID management device 10 manages main authentication inquiry information describing a legitimate combination of the aforementioned switching hub information and the formal ID of the electrical component P. The switching hub information includes, for example, the equipment IDs unique to the respective switching hubs H, the port numbers of the switching hubs H, and the like. As such, the ID management device 10 manages which electrical component P is to be connected to which port Q of the switching hubs H for each individual electrical component P of the electrical components P by using the main authentication inquiry information. Upon request, the ID management device 10 provides the formal ID of an electrical component P or the main authentication inquiry information including the combination of the formal ID of the electrical component P and the switching hub information.

The temporary ID assignment device 20 is a device that records the temporary ID in the electrical component P. For example, the temporary ID assignment device 20 is installed in a manufacturing line at the parts supplier F that provides the electrical components P. The temporary ID assignment device 20 assigns the temporary ID at the parts supplier F. During the manufacture of the electrical components P, the temporary ID assignment device 20 sends the generating information of temporary IDs to the ID management device 10 via the communication network NW, and requests the issuance of the temporary IDs. The temporary ID assignment device 20 then acquires the temporary IDs issued by the ID management device 10, and records the acquired temporary IDs in memories Pm of the respective electrical components P. At this time, the temporary ID assignment device 20 may record the temporary IDs in the memories Pm of the respective electrical components P via a wireless communication line (Over the Air: OTA) such as Wi-Fi. The temporary ID assignment device 20 sends the temporary IDs to the on-board router R via a wireless communication line such as Wi-Fi, for example. The on-board router R outputs the temporary IDs sent from the temporary ID assignment device 20 to the respective electrical components P (P1 to P9) via the switching hubs H (H1 to H4). The electrical components P (P1 to P9) record the temporary IDs output from the switching hubs H (H1 to H4) into the respective memories Pm.

The temporary ID assignment device 20 records the temporary ID in an electrical component P in which no temporary ID or formal ID has been recorded. In this case, the temporary ID assignment device 20 records the same temporary ID in the electrical components P of the same type. Here, the type of an electrical component P is classified by a port Q of the switching hubs H to which the electrical component P is connected, for example. For example, electrical components P1 that can be connected to the port Qb1 of the switching hub H2 are electrical components P of the same type, and the same temporary ID is recorded in the electrical components P1. Electrical components P2 that can be connected to the port Qb2 of the switching hub H2 are electrical components P of the same type, and the same temporary ID is recorded in the electrical components P2. Note that the electrical component P1 and the electrical component P2 are electrical components P of different types, and different temporary IDs are recorded in the respective electrical components P1 and P2. Although an example has been described in which the type of an electrical component P is classified by a port Q of the switching hubs H to which the electrical component P is connected, the embodiment is not limited to this example. Other classification methods may be used.

The temporary authentication devices 30 are devices that perform temporary authentication of the electrical components P installed in the vehicle V based on the temporary IDs. The temporary authentication devices 30 are built into the switching hubs H, for example. At the time of manufacturing the vehicle V, the temporary authentication devices 30 request the temporary authentication inquiry information of the electrical components P installed in the manufactured vehicle V, from the ID management device 10 via the communication network NW. The temporary authentication devices 30 then perform temporary authentication of the electrical components P connected to the switching hubs H based on the temporary authentication inquiry information acquired from the ID management device 10. Here, the temporary authentication is the process of validating the electrical components P connected to the switching hubs H for each type of the electrical components P. A valid electrical component P means a legitimate electrical component P to be connected to the switching hubs H.

For example, when an electrical component P with a temporary ID recorded is connected to one of the switching hubs H, the corresponding temporary authentication device 30 performs temporary authentication based on the switching hub information (actual connecting equipment information) describing the switching hub H to which the electrical component P is connected, the temporary ID of the electrical component P, and the temporary authentication inquiry information (a legitimate combination of legitimate switching hub information and the temporary ID of the legitimate electrical component P). The temporary authentication device 30 compares, for example, the switching hub information (the equipment ID and the port number of the switching hub H) of the connected electrical component P and the temporary ID of the connected electrical component P with the temporary authentication inquiry information (the legitimate combination of the legitimate switching hub information and the temporary ID of the legitimate electrical component P) acquired from the ID management device 10. When the switching hub information of the connected electrical component P and the temporary ID of the connected electrical component P match the switching hub information and the temporary ID of the electrical component P in the temporary authentication inquiry information acquired from the ID management device 10, the temporary authentication device 30 determines that the electrical component P is properly assembled to the switching hub H. On the other hand, when the switching hub information of the connected electrical component P and the temporary ID of the connected electrical component P do not match the switching hub information and the temporary ID of the electrical component P in the temporary authentication inquiry information acquired from the ID management device 10, the temporary authentication device 30 determines that the electrical component P is not properly assembled to the switching hub H.

As described above, the temporary authentication device 30 performs temporary authentication for each type of the electrical component P when the electrical component P is connected to the switching hub H by using the temporary ID, and thus the workability of assembling the electrical component P to the vehicle V can be improved compared with the conventional case where the individual ID of the electrical component P is used to individually authenticate the electrical component P. In the conventional case, another electrical component P of the same type but having a different identification ID cannot be assembled to the vehicle V, which has resulted in a decrease in workability when the electrical components P are assembled to the vehicle V.

The formal ID assignment device 40 is a device that records the formal ID in the electrical component P. For example, the formal ID assignment device 40 is installed in a manufacturing line at the vehicle manufacturer M. The formal ID assignment device 40 assigns the formal ID at the vehicle manufacturer M. During the manufacture of the electrical components P, the formal ID assignment device 40 sends the generating information of formal IDs to the ID management device 10 via the communication network NW, and requests the issuance of the formal IDs. The formal ID assignment device 40 then acquires the formal IDs issued by the ID management device 10, and records the acquired formal IDs in the memories Pm of the respective electrical components P. At this time, the formal ID assignment device 40 may record the formal IDs in the memories Pm of the respective electrical components P via a wireless communication line (Over the Air: OTA) such as Wi-Fi. The formal ID assignment device 40 sends the formal IDs to the on-board router R via a wireless communication line such as Wi-Fi, for example. The on-board router R outputs the formal IDs sent from the formal ID assignment device 40 to the respective electrical components P (P1 to P9) via the switching hubs H (H1 to H4). The electrical components P (P1 to P9) record the formal IDs output from the switching hubs H (H1 to H4) into the respective memories Pm.

The formal ID assignment device 40 records the formal ID in each individual electrical component P, the formal ID being different for each electrical component P. Specifically, the formal ID assignment device 40 records a first formal ID corresponding to the electrical component P1 in the electrical component P1, a second formal ID corresponding to the electrical component P2 in the electrical component P2, and a third formal ID corresponding to the electrical component P3 in the electrical component P3. Similarly, the formal ID assignment device 40 records fourth through ninth formal IDs corresponding to the electrical components P4 to P9, respectively, in the electrical components P4 to P9. The first to nine formal IDs are different identifiers from one another.

The main authentication devices 50 are devices that perform main authentication of the electrical components P installed in the vehicle V based on the formal IDs. The main authentication devices 50 are built into the switching hubs H. At the time of manufacturing the vehicle V, the main authentication devices 50 request the main authentication inquiry information of the electrical components P installed in the manufactured vehicle V, from the ID management device 10 via the communication network NW. The main authentication devices 50 then authenticate the electrical components P connected to the switching hubs H based on the main authentication inquiry information acquired from the ID management device 10. Here, the main authentication is the process of validating the electrical components P connected to the switching hubs H for each individual electrical component P. A valid electrical component P means a legitimate electrical component P to be connected to the switching hubs H.

For example, each of the main authentication device 50 performs main authentication based on the switching hub information describing the corresponding switching hub H to which the electrical component P with the formal ID recorded is connected, the formal ID of the electrical component P, and the main authentication inquiry information (a legitimate combination of legitimate switching hub information and the formal ID of the legitimate electrical component P). The main authentication device 50 compares, for example, the switching hub information (the equipment ID and the port number of the switching hub H) of the connected electrical component P and the formal ID of the connected electrical component P with the main authentication inquiry information (the legitimate combination of the legitimate switching hub information and the formal ID of the legitimate electrical component P) acquired from the ID management device 10. When the switching hub information of the connected electrical component P and the formal ID of the connected electrical component P match the switching hub information and the formal ID of the electrical component P in the main authentication inquiry information acquired from the ID management device 10, the main authentication device 50 determines that the electrical component P is properly assembled to the switching hub H. On the other hand, when the switching hub information of the connected electrical component P and the formal ID of the connected electrical component P do not match the switching hub information and the formal ID of the electrical component P in the main authentication inquiry information acquired from the ID management device 10, the main authentication device 50 determines that the electrical component P is not properly assembled to the switching hub H. As described above, the main authentication device 50 performs main authentication based on the formal ID recorded in the electrical component P, so that illegal modification or tampering of the electrical component P, spoofing, and the like can be inhibited, for example.

Figure 4:
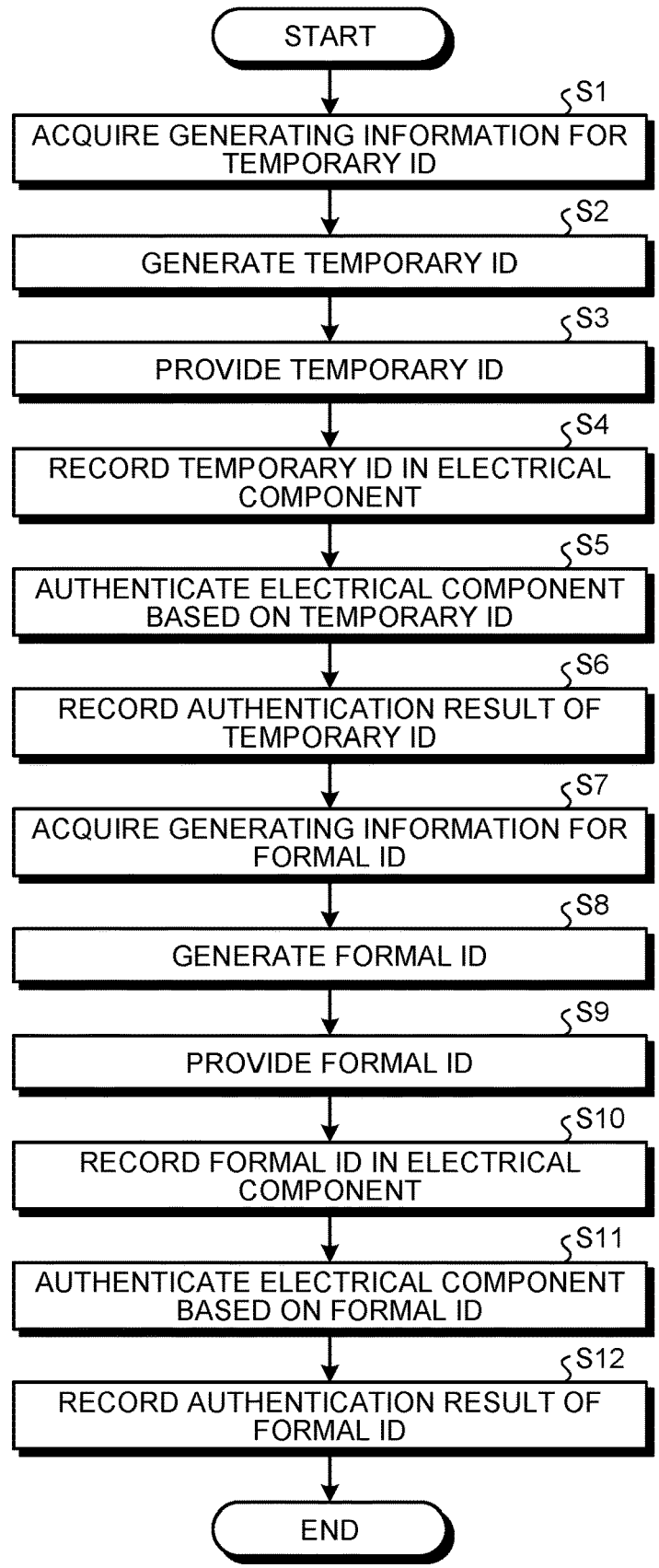
FIG. 4 is a flowchart illustrating an example operation of the authentication system according to the embodiment.

The following describes an example operation of the authentication system 1. FIG. 4 is a flowchart illustrating an example operation of the authentication system 1 according to the embodiment. In the authentication system 1, as illustrated in FIG. 4, the ID management device 10 acquires the generating information of a temporary ID (step S1). The ID management device 10 acquires, from the parts supplier F (temporary ID assignment device 20), the vehicle type code, the electrical component vehicle equipment code, the electrical component manufacturing location code, and the electrical component manufacturing lot code as generating information of the temporary ID, for example. Then, the ID management device 10 generates the temporary ID based on the acquired generating information of the temporary ID and generates the temporary authentication inquiry information based on the generated temporary ID and the switching hub information (step S2). Next, upon request from the temporary ID assignment device 20, the ID management device 10 provides the generated temporary ID to the temporary ID assignment device 20 (step S3). Furthermore, the temporary ID assignment device 20 records the temporary ID in the corresponding electrical component P (step S4). For example, the temporary ID assignment device 20 records the same temporary ID in electrical components P of the same type. Then, the temporary authentication device 30 performs temporary authentication of the electrical component P based on the temporary ID recorded in the electrical component P, the switching hub information, and the temporary authentication inquiry information (step S5). Furthermore, the ID management center C (ID management device 10) records an authentication result of the temporary ID (step S6).

Then, the ID management device 10 acquires the generating information of a formal ID (step S7). The ID management device 10 acquires, from the vehicle manufacturer M (formal ID assignment device 40), the vehicle body number code, the vehicle manufacturing date and time code, the temporary ID, and the vehicle manufacturing location code as generating information of the formal ID, for example. Then, the ID management device 10 generates the formal ID based on the acquired generating information of the formal ID and generates the main authentication inquiry information based on the generated formal ID and the switching hub information (step S8). Next, upon request from the formal ID assignment device 40, the ID management device 10 provides the generated formal ID to the formal ID assignment device 40 (step S9). Furthermore, the formal ID assignment device 40 records the formal ID in the corresponding electrical component P (step S10). Note that the formal ID assignment device 40 does not record the formal ID in an electrical component P that has not been temporarily authenticated by the temporary authentication device 30. Then, the main authentication device 50 performs main authentication of the electrical component P based on the formal ID recorded in the electrical component P, the switching hub information, and the main authentication inquiry information (step S11). Note that the main authentication device 50 does not perform main authentication of an electrical component P in which the formal ID has not been recorded by the formal ID assignment device 40. Furthermore, the ID management center C (ID management device 10) records an authentication result of the formal ID (step S12).

As described above, the authentication system 1 according to the embodiment includes the ID management device 10, the temporary ID assignment device 20, the temporary authentication devices 30, the formal ID assignment device 40, and the main authentication devices 50. For the electrical components P to be connected to the switching hubs H installed in the vehicle V, the ID management device 10 issues a temporary ID for identifying a type of the electrical components P for each type, and a formal ID for identifying an individual electrical component P of the electrical components P for each individual electrical component, and manages temporary authentication inquiry information describing a legitimate combination of the temporary ID of the electrical component and the switching hub information describing the corresponding switching hub H to which the electrical component P is connected, and main authentication inquiry information describing a legitimate combination of the formal ID of the electrical component P and the switching hub information. The temporary ID assignment device 20 records the same temporary ID in electrical components P of the same type. The corresponding temporary authentication device 30 performs temporary authentication of the electrical component P to be installed in the vehicle V based on the temporary ID recorded in the electrical component P. The formal ID assignment device 40 records the formal ID in each individual electrical component P, the formal ID being different for each electrical component P. The main authentication device 50 performs main authentication of the electrical component P to be installed in the vehicle V based on the formal ID recorded in the electrical component P.

In the authentication system 1 configured as described above, the ID management device 10 issues the temporary ID to the electrical component P with no ID recorded, the electrical component P having no recorded temporary ID or formal ID, and generates the temporary authentication inquiry information based on the issued temporary ID and the switching hub information. The temporary ID assignment device 20 records the temporary ID in the electrical component P with no ID recorded in accordance with the type of the electrical component P. When the electrical component P with the temporary ID recorded by the temporary ID assignment device 20 is connected to one of the switching hubs H, the corresponding temporary authentication device 30 performs temporary authentication based on the switching hub information describing the switching hub H to which the electrical component P is connected, the temporary ID of the electrical component P, and the temporary authentication inquiry information. The ID management device 10 issues the formal ID to the electrical component P that has been validated by the temporary authentication by the temporary authentication device 30, and generates the main authentication inquiry information based on the issued formal ID and the switching hub information. The formal ID assignment device 40 records the formal ID in each individual electrical component P that has been validated, the formal ID being different for each electrical component P. The corresponding main authentication device 50 performs main authentication based on the switching hub information of the switching hub H to which the electrical component P with the formal ID recorded by the formal ID assignment device 40 is connected, the formal ID of the electrical component P, and the main authentication inquiry information.

With this configuration, the authentication system 1 performs temporary authentication for each type of the electrical component P by using the temporary ID when the electrical component P is assembled to the vehicle V, and thus the workability of assembling the electrical component P to the vehicle V can be improved compared with the conventional case where the electrical component P is individually authenticated, allowing proper performance of the authentication process. In the conventional case, another electrical component P of the same type but having a different identification ID cannot be assembled to the vehicle V, which has resulted in a decrease in workability when the electrical components P are assembled to the vehicle V. In addition, the authentication system 1 records the formal ID in each electrical component P that has been temporarily authenticated, the formal ID being different for each electrical component P, so that a unique formal ID can be recorded smoothly in each electrical component P. Then, the authentication system 1 performs main authentication based on the formal ID recorded in the electrical component P, so that illegal modification or tampering of the electrical component P, spoofing, and the like can be inhibited, for example.

In the above authentication system 1, the formal ID assignment device 40 does not record the formal ID in an electrical component P that has not been validated. The corresponding main authentication device 50 does not perform main authentication of the electrical component P in which the formal ID has not been recorded by the formal ID assignment device 40. With this configuration, the authentication system 1 can properly perform main authentication of the electrical component P for which the temporary authentication has been confirmed.

In the above authentication system 1, the temporary ID assignment device 20 records the temporary ID in the electrical component P via a wireless communication line that performs wireless communication. The formal ID assignment device 40 records the formal ID in the electrical component P via a wireless communication line that performs wireless communication. With this configuration, the authentication system 1 can reduce signal lines used to record the temporary ID and the formal ID in the electrical component P, reducing the signal line routing space and workload.

In the above authentication system 1, the temporary authentication devices 30 and the main authentication devices 50 are built into the switching hubs H. This configuration allows for the temporary and main authentication with the switching hubs H alone.

Modifications

Figure 5:
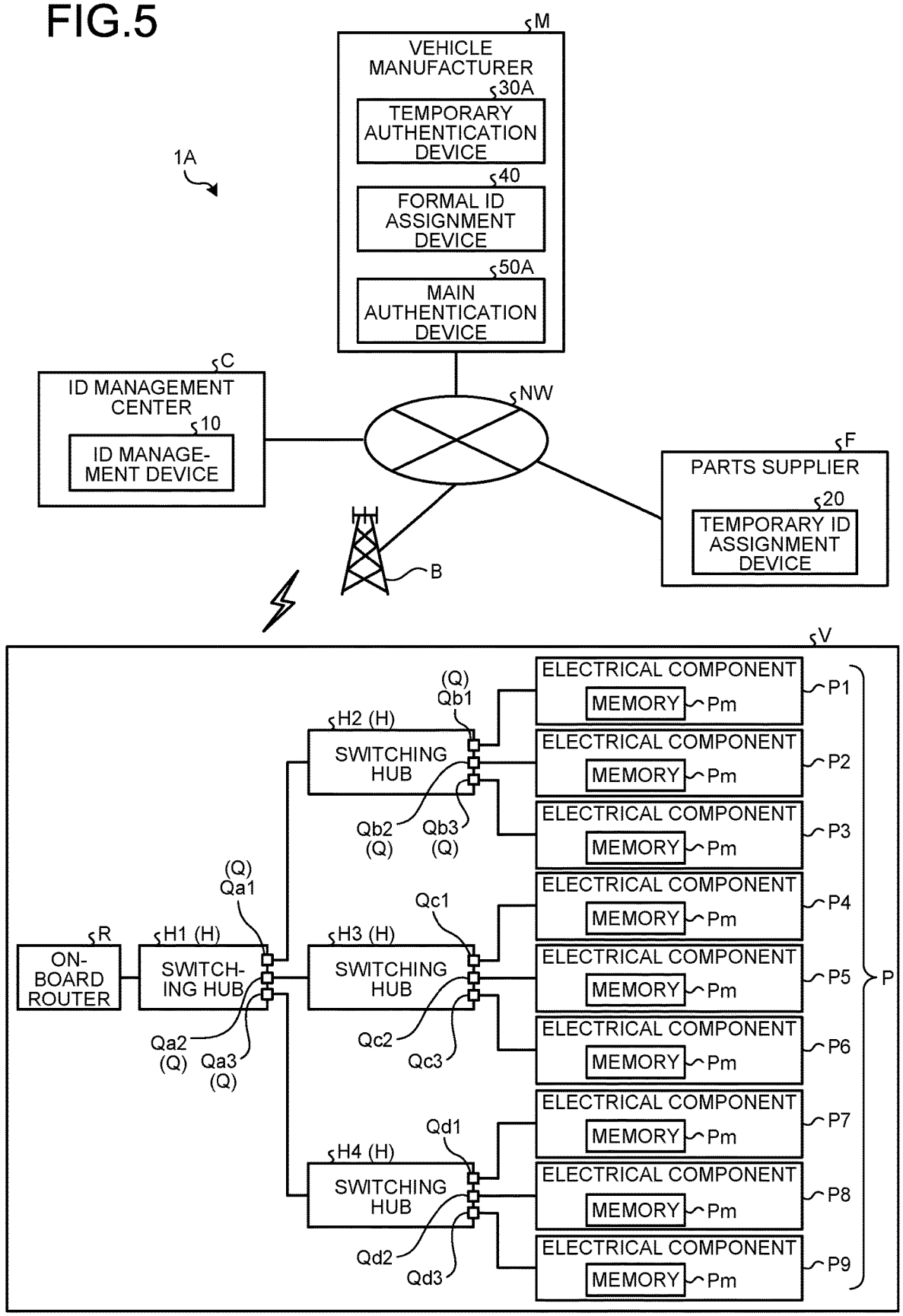
FIG. 5 is a block diagram illustrating an example configuration of an authentication system according to a modification of the embodiment.

The following describes modifications of the embodiment. Note that, in the modifications, components equivalent to those of the embodiment will be labeled with the same sign and detailed description thereof will be omitted. FIG. 5 is a block diagram illustrating an example configuration of an authentication system 1A according to the modification of the embodiment. The authentication system 1A according to the modification differs from the authentication system 1 according to the embodiment in that a temporary authentication device 30A and a main authentication device 50A are not provided in the switching hubs H. As illustrated in FIG. 5, for example, the temporary authentication device 30A and the main authentication device 50A may be provided in a manufacturing line at the vehicle manufacturer M.

Figure 6:
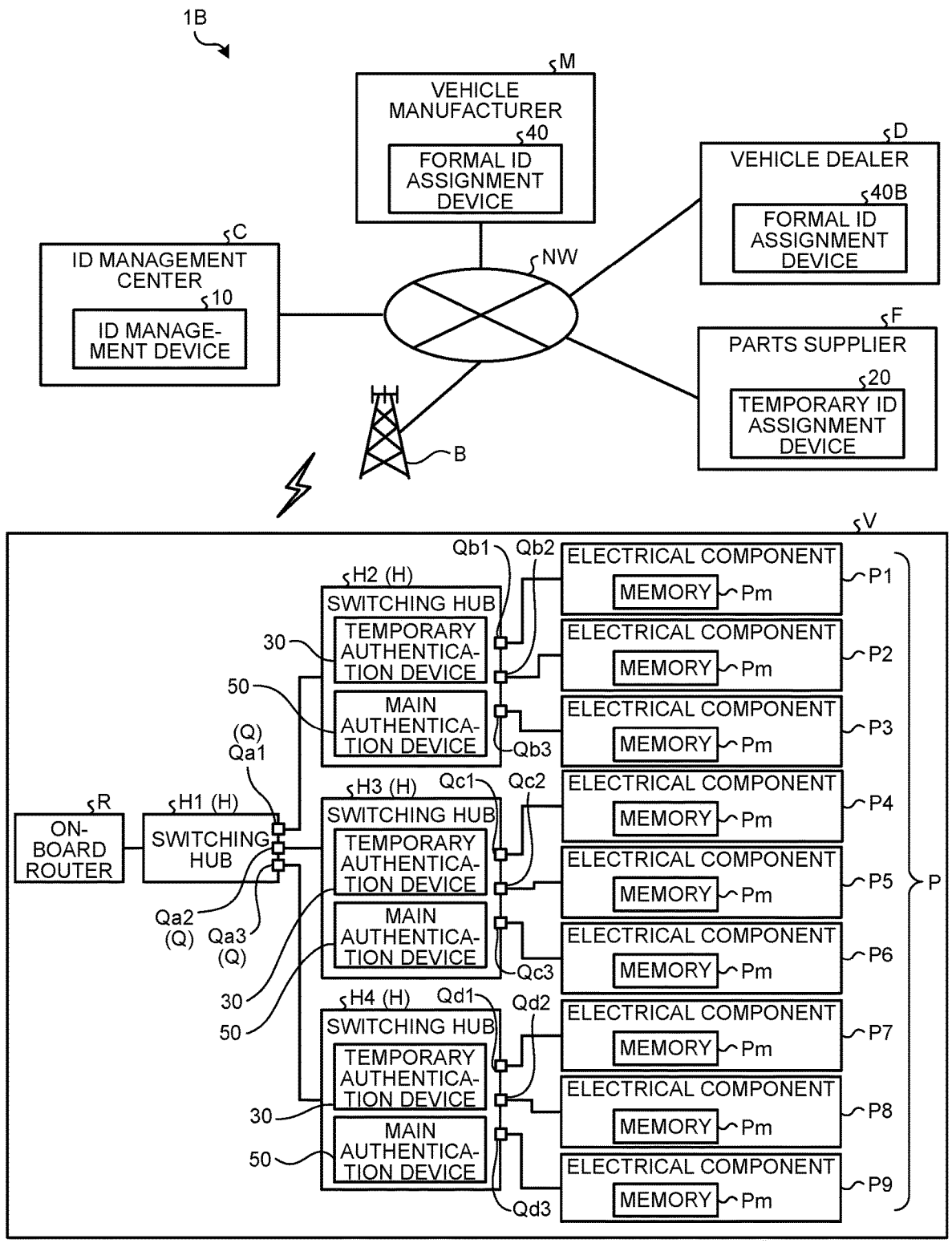
FIG. 6 is a block diagram illustrating an example configuration of the authentication system according to another modification of the embodiment.

FIG. 6 is a block diagram illustrating an example configuration of an authentication system 1B according to another modification of the embodiment. FIG. 7 is a diagram illustrating an example configuration of a replacement temporary ID according to the other modification of the embodiment. FIG. 8 is a diagram illustrating an example configuration of a replacement formal ID according to the other modification of the embodiment. The authentication system 1B according to the other modification differs from the authentication systems 1 and 1A according to the embodiment in that the authentication system 1B also performs authentication when an electrical component P is replaced.

The authentication system 1B according to the other modification further includes a formal ID assignment device 40B over the authentication system 1 according to the embodiment, as illustrated in FIG. 6. The ID management device 10 issues a replacement temporary ID and a replacement formal ID.

Here, the replacement temporary ID is an identifier for identifying, for each type, a type of a replacement electrical component P (P1A) to be replacing an electrical component P installed in the vehicle V. The same replacement temporary ID is recorded in replacement electrical components P of the same type. The replacement temporary ID includes a plurality of items. As illustrated in FIG. 7, for example, the replacement temporary ID includes the items "vehicle type code", "electrical component vehicle equipment code", "electrical component repair date and time code", and "electrical component repair location code". The vehicle type code is an identifier indicating the vehicle type of the vehicle V. The same vehicle type is indicated by the same identifier. The electrical component vehicle equipment code is an identifier for each type of the electrical components P. The electrical components P of the same type have the same identifier. The electrical component repair date and time code is an identifier indicating the date and time of repair of each electrical component. The electrical component repair location code is an identifier indicating the repair location of each electrical component P. The same repair location is indicated by the same identifier. the ID management device 10 acquires, from a vehicle dealer D (formal ID assignment device 40B), the vehicle type code, the electrical component vehicle equipment code, the electrical component repair date and time code, and the electrical component repair location code as generating information of a replacement temporary ID, and generates the replacement temporary ID based on the acquired generating information. The ID management device 10 may disable the replacement temporary ID after a specified time has elapsed from the generation of the replacement temporary ID. Note that, after generating the replacement formal ID of the replacement electrical component P, the ID management device 10 may disable the replacement temporary ID of the replacement electrical component P for which the replacement formal ID has been generated.

The ID management device 10 acquires, from the parts supplier F (temporary ID assignment device 20), the switching hub information (legitimate connecting equipment information) describing the switching hubs H to which the replacement electrical components P are connected. The ID management device 10 manages temporary authentication inquiry information describing a legitimate combination of the acquired switching hub information and the temporary ID of the replacement electrical component P. The switching hub information includes, for example, the equipment IDs unique to the respective switching hubs H, the port numbers of the switching hubs H, and the like. As such, the ID management device 10 manages which replacement electrical component P is to be connected to which port Q of the switching hubs H for each type of the replacement electrical components P by using the temporary authentication inquiry information.

The replacement formal ID is an identifier for identifying an individual replacement electrical component P of the individual replacement electrical components P for each individual replacement electrical component P. A different replacement formal ID is recorded in each individual replacement electrical component P. The replacement formal ID includes a plurality of items. As illustrated in FIG. 8, for example, the replacement formal ID includes the items "vehicle body number code", "replacement completion date and time code", "replacement temporary ID", and "electrical component replacement location code". The vehicle body number code is a unique identifier assigned to each vehicle body of the vehicle V. The replacement completion date and time code is an identifier indicating the date and time of replacement with the replacement electrical component P. The electrical component replacement location code is an identifier indicating the location of replacement with the replacement electrical component P. The ID management device 10 acquires, from the vehicle dealer (formal ID assignment device 40A), the vehicle body number code, the replacement completion date and time code, the replacement temporary ID, and the electrical component replacement location code as generating information of a replacement formal ID, and generates the replacement formal ID based on the acquired generating information.

The ID management device 10 manages main authentication inquiry information describing a legitimate combination of the aforementioned switching hub information and the formal ID of the replacement electrical component P. The switching hub information includes, for example, the equipment IDs unique to the respective switching hubs H, the port numbers of the switching hubs H, and the like. As such, the ID management device 10 manages which replacement electrical component P is to be connected to which port Q of the switching hubs H for each individual electrical component P of the replacement electrical components P by using the main authentication inquiry information.

During the manufacture of the replacement electrical components P, the replacement temporary ID assignment device 20 sends the generating information of replacement temporary IDs to the ID management device 10 via the communication network NW, and requests the issuance of the replacement temporary IDs. The temporary ID assignment device 20 then acquires the replacement temporary IDs issued by the ID management device 10, and records the acquired replacement temporary IDs in the memories Pm of the respective replacement electrical components P. The temporary ID assignment device 20 records the same replacement temporary ID in the replacement electrical components P of the same type.

The temporary authentication devices 30 perform temporary authentication of the replacement electrical components P to be installed in the vehicle V based on the replacement temporary IDs recorded in the respective replacement electrical component P. When an electrical component P is replaced with the replacement electrical component P at the vehicle dealer D, the temporary authentication device 30 requests the temporary authentication inquiry information of the replacing replacement electrical component P from the ID management device 10 via the communication network NW. The temporary authentication device 30 then performs temporary authentication of the replacement electrical component P connected to one of the switching hubs H based on the temporary authentication inquiry information acquired from the ID management device 10. When the replacement electrical component P with the replacement temporary ID recorded is connected to the switching hub H, for example, the temporary authentication device 30 performs temporary authentication based on the switching hub information describing the switching hub H to which the replacement electrical component P is connected, the temporary ID of the replacement electrical component P, and the temporary authentication inquiry information.

The formal ID assignment device 40B is a device that records the replacement formal ID in the replacement electrical component P. For example, the formal ID assignment device 40B is installed at the vehicle dealer D. The formal ID assignment device 40B assigns the replacement formal ID at the vehicle dealer D. During the replacement with the replacement electrical component P, the formal ID assignment device 40B sends the generating information of the replacement formal ID to the ID management device 10 via the communication network NW, and requests the issuance of the replacement formal ID. The formal ID assignment device 40B then acquires the replacement formal ID issued by the ID management device 10, and records the acquired replacement formal ID in the memory Pm of the replacement electrical component P. The formal ID assignment device 40B, for example, records the replacement formal ID in each individual replacement electrical component P, the replacement formal ID being different for each replacement electrical component P.

The main authentication devices 50 are devices that perform main authentication of the replacement electrical components P to be installed in the vehicle V based on the replacement formal IDs recorded in the respective replacement electrical components P. At the time of replacement with the replacement electrical components P, the main authentication devices 50 request the main authentication inquiry information of the replacement electrical components P to be installed in the vehicle V, from the ID management device 10 via the communication network NW. The main authentication devices 50 then perform main authentication of the replacement electrical components P connected to the switching hubs H based on the main authentication inquiry information acquired from the ID management device 10. Each of the main authentication devices 50 performs main authentication based on, for example, the switching hub information of the corresponding switching hub H to which the replacement electrical component P with the replacement formal ID recorded is connected, the replacement formal ID of the replacement electrical component P, and the main authentication inquiry information.

As described above, in the authentication system 1B according to the other modification, the ID management device 10 issues a replacement temporary ID for identifying, for each type, a type of replacement electrical components P to be replacing the electrical components P installed in the vehicle V, and a replacement formal ID for identifying an individual replacement electrical component P of the replacement electrical components P for each individual replacement electrical component P, and manages the temporary authentication inquiry information describing a legitimate combination of the replacement temporary ID of the replacement electrical component P and switching hub information describing the switching hub H to which the replacement electrical component P is connected, and main authentication inquiry information describing a legitimate combination of the replacement formal ID of the replacement electrical component P and the switching hub information. The ID management device 10 issues the replacement temporary ID to the replacement electrical component P with no ID recorded, the replacement electrical component P having no recorded replacement temporary ID or replacement formal ID, and generates temporary authentication inquiry information based on the issued replacement temporary ID and the switching hub information. The temporary ID assignment device 20 records the replacement temporary ID in the replacement electrical component P with no ID recorded in accordance with the type of the replacement electrical component P. When the replacement electrical component P with the replacement temporary ID recorded by the temporary ID assignment device 20 is connected to one of the switching hubs H, the corresponding temporary authentication device 30 performs temporary authentication based on the switching hub information describing the switching hub H to which the replacement electrical component P is connected, the temporary ID of the replacement electrical component P, and the temporary authentication inquiry information. The ID management device 10 issues the replacement formal ID to the replacement electrical component P that has been validated by the temporary authentication by the temporary authentication device 30, and generates the main authentication inquiry information based on the issued replacement formal ID and the switching hub information. The formal ID assignment device 40B records the replacement formal ID in each individual replacement electrical component P that has been validated, the replacement formal ID being different for each replacement electrical component P. The corresponding main authentication device 50 performs main authentication based on the switching hub information of the switching hub H to which the replacement electrical component P with the replacement formal ID recorded by the formal ID assignment device 40 is connected, the replacement formal ID of the replacement electrical component P, and the main authentication inquiry information. With this configuration, the authentication system 1B can inhibit illegal modification or tampering of the replacement electrical component P, spoofing, and the like.

In the above explanation, although an example has been described in which the temporary ID assignment device 20 records the temporary ID in the electrical component P via a wireless communication line such as Wi-Fi, and the formal ID assignment device 40 records the formal ID in the electrical component P via a wireless communication line such as Wi-Fi, the embodiment is not limited to this example. The temporary ID and the formal ID may be recorded via a wired line.

The installation locations of the ID management device 10, the temporary ID assignment device 20, the temporary authentication devices 30, 30A, and 30B, the formal ID assignment devices 40 and 40A, and the main authentication devices 50, 50A and 50B are not limited to the locations described above, and may be any other locations.

The authentication system according to the present embodiment performs temporary authentication by recording the same temporary ID in parts of the same type, and after the temporary authentication, performs main authentication by recording a different formal ID for each of the parts. This configuration allows the authentication system to properly perform the authentication process of the parts installed in a vehicle while ensuring the security of the parts.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authentication system comprising:
an ID management device that, for a plurality of parts to be connected to a connecting equipment installed in a vehicle, issues a temporary ID for identifying a type of the parts for each type, and a formal ID for identifying an individual part of the parts for each individual part, and manages temporary authentication inquiry information describing a legitimate combination of the temporary ID of the part and legitimate connecting equipment information describing the connecting equipment to which the part is connected, and main authentication inquiry information describing a legitimate combination of the formal ID of the part and the legitimate connecting equipment information;

a temporary ID assignment device that records the same temporary ID in the parts of the same type;

a temporary authentication device that performs temporary authentication of each of the parts to be installed in the vehicle based on the temporary ID recorded in the part;

a formal ID assignment device that records the formal ID in each of the parts, the formal ID being different for each part; and a main authentication device that performs main authentication of the part to be installed in the vehicle based on the formal ID recorded in the part, wherein the ID management device issues the temporary ID to the part with no ID recorded, the part having no recorded temporary ID or formal ID, and generates the temporary authentication inquiry information based on the issued temporary ID and the legitimate connecting equipment information, the temporary ID assignment device records the temporary ID in the part with no ID recorded in accordance with the type of the part, when the part with the temporary ID recorded by the temporary ID assignment device is connected to the connecting equipment, the temporary authentication device performs temporary authentication based on actual connecting equipment information describing the connecting equipment to which the part is connected, the temporary ID of the part, and the temporary authentication inquiry information, the ID management device issues the formal ID to the part that has been validated by the temporary authentication by the temporary authentication device, and generates the main authentication inquiry information based on the issued formal ID and the legitimate connecting equipment information, the formal ID assignment device records the formal ID in each of the parts that have been validated, the formal ID being different for each part, and the main authentication device performs main authentication based on the actual connecting equipment information of the connecting equipment to which the part with the formal ID recorded by the formal ID assignment device is connected, the formal ID of the part, and the main authentication inquiry information.

2. The authentication system according to claim 1, wherein the formal ID assignment device does not record the formal ID in the part that has not been validated, and the main authentication device does not perform the main authentication of the part in which the formal ID has not been recorded by the formal ID assignment device.

3. The authentication system according to claim 1, wherein the ID management device issues a replacement temporary ID for identifying, for each type, a type of replacement parts to be replace the parts installed in the vehicle, and a replacement formal ID for identifying an individual replacement part of the replacement parts for each individual replacement part, and manages temporary authentication inquiry information describing a legitimate combination of the replacement temporary ID of the replacement part and legitimate connecting equipment information describing the connecting equipment to which the replacement part is connected, and main authentication inquiry information describing a legitimate combination of the replacement formal ID of the replacement part and the legitimate connecting equipment information, the ID management device issues the replacement temporary ID to the replacement part with no ID recorded, the replacement part having no recorded replacement temporary ID or replacement formal ID, and generates the temporary authentication inquiry information based on the issued replacement temporary ID and the legitimate connecting equipment information, the temporary ID assignment device records the replacement temporary ID in the replacement part with no ID recorded in accordance with the type of the replacement part, when the replacement part with the replacement temporary ID recorded by the temporary ID assignment device is connected to the connecting equipment, the temporary authentication device performs temporary authentication based on actual connecting equipment information describing the connecting equipment to which the replacement part is connected, the temporary ID of the replacement part, and the temporary authentication inquiry information, the ID management device issues the replacement formal ID to the replacement part that has been validated by the temporary authentication by the temporary authentication device, and generates the main authentication inquiry information based on the issued replacement formal ID and the legitimate connecting equipment information, the formal ID assignment device records the replacement formal ID in each of the replacement parts that have been validated, the replacement formal ID being different for each replacement part, and the main authentication device performs main authentication based on the actual connecting equipment information of the connecting equipment to which the replacement part with the replacement formal ID recorded by the formal ID assignment device is connected, the replacement formal ID of the replacement part, and the main authentication inquiry information.

4. The authentication system according to claim 2, wherein the ID management device issues a replacement temporary ID for identifying, for each type, a type of replacement parts to be replace the parts installed in the vehicle, and a replacement formal ID for identifying an individual replacement part of the replacement parts for each individual replacement part, and manages temporary authentication inquiry information describing a legitimate combination of the replacement temporary ID of the replacement part and legitimate connecting equipment information describing the connecting equipment to which the replacement part is connected, and main authentication inquiry information describing a legitimate combination of the replacement formal ID of the replacement part and the legitimate connecting equipment information, the ID management device issues the replacement temporary ID to the replacement part with no ID recorded, the replacement part having no recorded replacement temporary ID or replacement formal ID, and generates the temporary authentication inquiry information based on the issued replacement temporary ID and the legitimate connecting equipment information, the temporary ID assignment device records the replacement temporary ID in the replacement part with no ID recorded in accordance with the type of the replacement part, when the replacement part with the replacement temporary ID recorded by the temporary ID assignment device is connected to the connecting equipment, the temporary authentication device performs temporary authentication based on actual connecting equipment information describing the connecting equipment to which the replacement part is connected, the temporary ID of the replacement part, and the temporary authentication inquiry information, the ID management device issues the replacement formal ID to the replacement part that has been validated by the temporary authentication by the temporary authentication device, and generates the main authentication inquiry information based on the issued replacement formal ID and the legitimate connecting equipment information, the formal ID assignment device records the replacement formal ID in each of the replacement parts that have been validated, the replacement formal ID being different for each replacement part, and the main authentication device performs main authentication based on the actual connecting equipment information of the connecting equipment to which the replacement part with the replacement formal ID recorded by the formal ID assignment device is connected, the replacement formal ID of the replacement part, and the main authentication inquiry information.

5. The authentication system according to claim 1, wherein the temporary ID assignment device records the temporary ID in the part via a wireless communication line that performs wireless communication, and the formal ID assignment device records the formal ID in the part via a wireless communication line that performs wireless communication.

6. The authentication system according to claim 2, wherein the temporary ID assignment device records the temporary ID in the part via a wireless communication line that performs wireless communication, and the formal ID assignment device records the formal ID in the part via a wireless communication line that performs wireless communication.

7. The authentication system according to claim 3, wherein the temporary ID assignment device records the temporary ID in the part via a wireless communication line that performs wireless communication, and the formal ID assignment device records the formal ID in the part via a wireless communication line that performs wireless communication.

8. The authentication system according to claim 1, wherein the temporary authentication device and the main authentication device are built into the connecting equipment.

9. The authentication system according to claim 2, wherein the temporary authentication device and the main authentication device are built into the connecting equipment.

10. The authentication system according to claim 3, wherein the temporary authentication device and the main authentication device are built into the connecting equipment.

11. The authentication system according to claim 5, wherein the temporary authentication device and the main authentication device are built into the connecting equipment.

* * * * *